Dec. 19, 1950  J. E. SCHULTZE  2,534,629
APPARATUS FOR MANUFACTURING A CONTINUOUS
STRIP OF SOLID ALCOHOL
Filed July 8, 1948
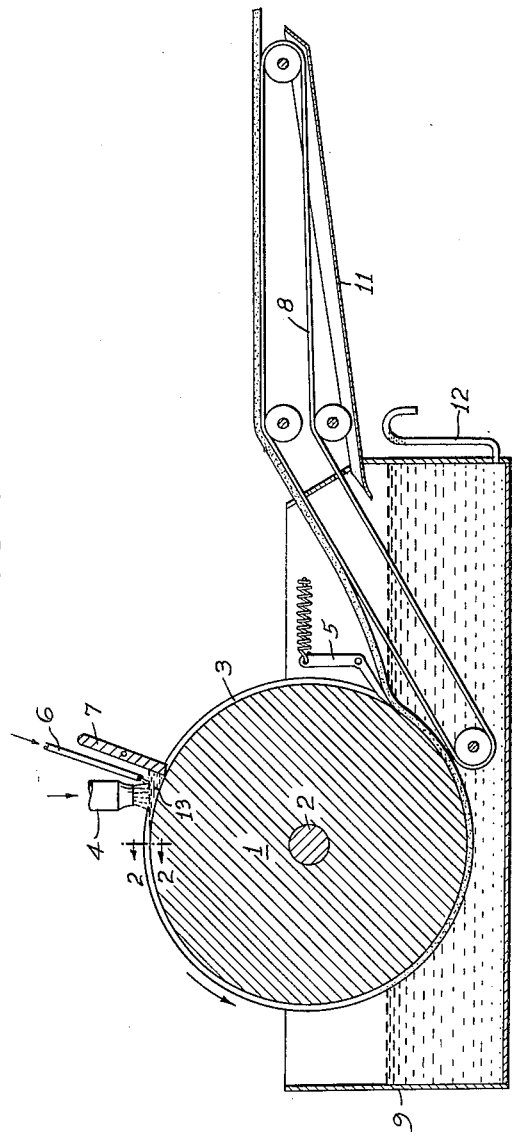
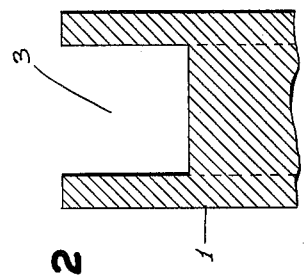
INVENTOR
John E. Schultze
BY
Pennie, Edmonds, Morton & Barrows
ATTORNEYS Patented Dec. 19, 1950

2,534,629

UNITED STATES PATENT OFFICE 2,534,629

APPARATUS FOR MANUFACTURING A CONTINUOUS STRIP OF SOLID ALCOHOL

John E. Schultze, Baltimore, Md., assignor to U. S. Industrial Chemicals, Inc., New York, N. Y., a corporation of Delaware Application July 8, 1948, Serial No. 37,641

2 Claims. (Cl. 18—15)

This invention relates to an apparatus adapted for use in the manufacture of a continuous strip of solid alcohol.

It is known in the art to manufacture small cubes of solid alcohol, such cubes being in general composed of a gel containing ethyl alcohol, methyl alcohol, acetone, cellulose nitrate and water. The gel is made by means of a feed controlled nozzle, which is provided with separate passages for the respective flows of low-proof alcohol and nitrocellulose solution. Contact of the low-proof alcohol with the nitrocellulose solution at the outlet of the nozzle produces a semi-gel, which flows into suitable elongated containers or molds moving at regulated speed under and away from the nozzle. In the conventional method of manufacturing the cubes of solid alcohol, the strip of gel is manually removed from the mold, and is thereafter cut into cubes of the desired size. The procedure just described is both time-consuming and uneconomical from the standpoint of materials consumption.

It is therefore the primary object of this invention to provide an apparatus in which a continuous strip of solid alcohol may be prepared at an advantageous rate, with reduced handling, and with a high yield of the desired product, based upon the amount of materials employed.

Other objects will appear hereinafter.

The aforementioned and other objects are accomplished in accordance with the present invention by providing an apparatus comprising a wheel having around its periphery a channel of suitable cross-sectional area, depending upon the cross-sectional area of the strip which it is desired that the apparatus will produce; means for rotating the wheel; means for feeding a mixture of low-proof alcohol and a solution of nitrocellulose to the channel; gel-strip removal means; a stabilizer finger positioned adjacent the mixture-feeding means; and means for supplying water to the channel at a point intermediate the mixture-feeding means and the stabilizer finger. The apparatus also comprises a tank or reservoir containing a volume of water or low-proof alcohol, into which the wheel is partially immersed.

For a more complete understanding of the apparatus of the present invention, reference is made to the accompanying drawings in which Figure 1 is a side elevation of an apparatus falling within the scope of the present invention and Figure 2 is a fragmentary cross-sectional view taken along the line 2—2.

In Figure 1, the numeral 1 represents the wheel mounted on shaft 2 and rotated by suitable means (not shown), the wheel having around its periphery a channel 3 of suitable cross section (Fig. 2). The apparatus is also provided with means 4 for supplying a suitable mixture of low-proof alcohol and nitrocellulose solution to the channel; a spring-tensioned, metal, gel-strip removal blade 5; means 6 for supplying water to the channel; and a stabilizer finger 7.

As the apparatus has been shown in Fig. 1, it also comprises a conveyor system 8 (provided with a drip-pan 11) for handling the strip of solid alcohol after it has been removed from the channel by the gel-strip removal means. Also, the wheel is partially immersed in water or low-proof alcohol contained in the tank 9 (provided with over-flow pipe 12) which traps for recovery and re-use superfluous low-proof alcohol, wets the channel to reduce the sticking of the strip of gel thereto, and also speeds the jellying process by subjecting the gel to the action of the water or low-proof alcohol.

Various modifications may be made in the apparatus specifically described to provide other embodiments falling within the scope of the present invention. Thus, the particular design of the means for feeding the mixture of water and alcoholic solution of cellulose nitrate is not critical, and any of such means customarily employed in the art may be embodied into the apparatus. Any conventional means may be employed for handling the continuous strip of solid alcohol after it has been removed from the channel by means of the scraper blade, and it is not essential that the apparatus be provided with any such means, since the removed strip may, if desired, be handled manually.

It is essential, however, that the apparatus be provided with the stabilizing finger, which fits snugly within the channel adjacent the point at which the flow of gel mixture from the nozzle contacts the channel. In such position, the finger prevents a backward spreading of the gel mixture, which spreading, if not prevented, results in irregular depth of the gel strip. In addition to this function, the finger also serves to dam the water being supplied to the channel to the point of mixture contact with the channel. The formation of a water pocket 13 at this point is very important, since the pocket serves to receive the mixture and by its action on the mixture quickens the solidification thereof, so that the gel may properly mold and cling to the channel until it is removed. Without the quickened solidification at this point, the apparatus will not operate successfully. During normal operation of the apparatus, the water leaks past the restraining finger and down the approach (right, in Fig. 1) side of the wheel and into the tank. The rate of water feed may be varied widely, so long as a sufficient flow of water is maintained to produce the water pocket.

In operation, I have employed a wooden wheel having a diameter of about 30" and having around its periphery a channel having a width and depth of about 1". Wheels made of other materials (e. g., metals) and of other sizes may, of course, also be used. The stabilizing finger was likewise made of wood, spring-tensioned so as to fit snugly into the channel, although it may also be made of metals. The wheel rotated at about 20 R. P. M., and produced a continuous strip of solid alcohol, which strip was thereafter cut up into cubes in the usual manner. The mixture fed to the wheel was a conventional mixture of low-proof alcohol and solution of cellulose nitrate (about 12% nitrogen).

The apparatus herein described is possessed of numerous advantages. For example, it makes possible the production of a continuous strip of solid alcohol at a rapid rate, with a minimum of handling, and with a high yield of the desired product. In addition, the apparatus enables the efficient recovery of materials which are generally wasted in the conventional process in which the strip of solid alcohol is formed in molds and is thereafter manually removed therefrom.

I claim:

1. An apparatus suitable for use in the manufacture of a continuous strip of solid alcohol, the said apparatus comprising a wheel having around its periphery a channel of suitable cross-sectional area, means for rotating the wheel, means above the wheel for feeding a mixture of low-proof alcohol and a solution of cellulose nitrate to said channel, a stabilizer finger extending and fitting snugly within said channel adjacent the mixture feeding means, and means for supplying water to the channel between said mixture feeding means and said stabilizer finger, the said wheel being partially immersed in a tank.

2. An apparatus suitable for use in the manufacture of a continuous strip of solid alcohol, the said apparatus comprising a wheel having around its periphery a channel of suitable cross-sectional area, means for rotating the wheel, means above the wheel for feeding a mixture of low-proof alcohol and a solution of cellulose nitrate to said channel, a stabilizer finger extending and fitting snugly within said channel adjacent the mixture feeding means, means for supplying water to the channel between said mixture feeding means and said stabilizer finger, and gel strip removal means, the said wheel being partially immersed in a tank.

JOHN E. SCHULTZE.

REFERENCES CITED

The following references are of record in the file of this patent:

UNITED STATES PATENTS

| Number | Name | Date |
| --- | --- | --- |
| 1,237,587 | Upton | Aug. 21, 1917 |
| 1,944,848 | Scheidt | Jan. 23, 1934 |
| 2,118,438 | Lawrence | May 24, 1938 |